United States Patent [19]

Takayama

[11] Patent Number: 4,994,917
[45] Date of Patent: Feb. 19, 1991

[54] IMAGE PICKUP APPARATUS WITH PICKUP TIME CONTROL AND VARIABLE SIGNAL SUPPRESSION OR CLIPPING

[75] Inventor: Tsutomu Takayama, Kawasaki, Japan

[73] Assignee: Canon Kabushiki Kaisha, Tokyo, Japan

[21] Appl. No.: 323,822

[22] Filed: Mar. 15, 1989

[30] Foreign Application Priority Data

Mar. 16, 1988 [JP] Japan .................................. 63-060604

[51] Int. Cl.$^5$ ........................ H04N 3/14; H04N 5/335
[52] U.S. Cl. ........................... 358/213.15; 358/213.16; 358/213.22; 358/163; 358/162
[58] Field of Search ...................... 358/213.15, 213.16, 358/163, 162, 213.22

[56] References Cited

U.S. PATENT DOCUMENTS

| 4,336,552 | 6/1982 | Tanaka | 358/162 |
| 4,510,528 | 4/1985 | Bergen | 358/163 |
| 4,541,014 | 9/1985 | Yagi | 358/162 |
| 4,559,558 | 12/1985 | Hosoya | 358/162 |
| 4,675,738 | 6/1987 | Okino | 358/213.16 |
| 4,746,985 | 5/1988 | Waldron | 358/162 |
| 4,814,811 | 3/1989 | Saito | 358/909 |

Primary Examiner—Donnie L. Crosland
Assistant Examiner—Kinfe-Michael Negash
Attorney, Agent, or Firm—Fitzpatrick, Cella, Harper & Scinto

[57] ABSTRACT

An image pickup apparatus includes an image pickup element and a photoelectric conversion time control circuit to control the photo-electric conversion time of the image pickup element. The image pickup apparatus includes a suppressing circuit for changing the signal of a predetermined band in a video signal from the image pickup element in accordance with the photoelectric conversion time, thereby suppressing the signal.

16 Claims, 3 Drawing Sheets

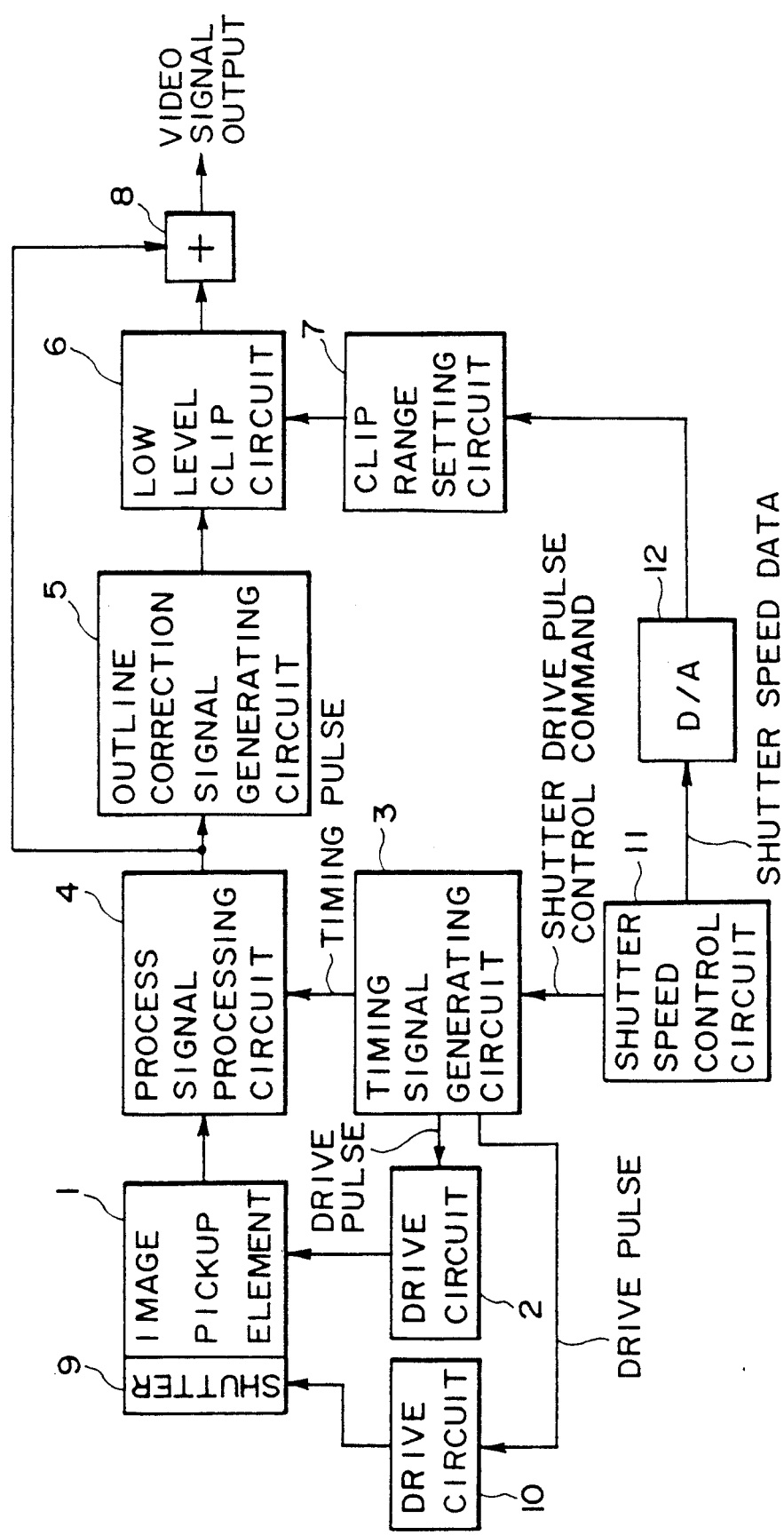
F I G. 1

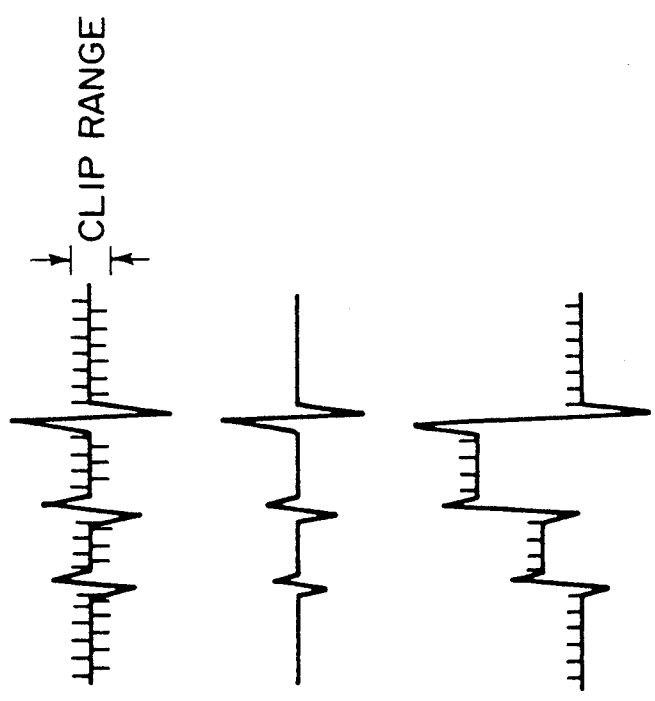
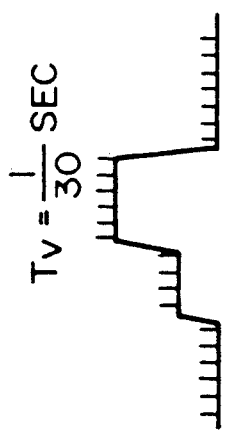
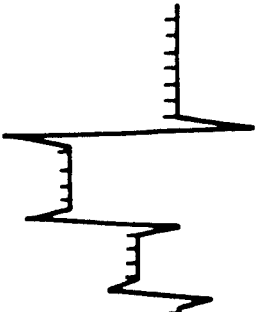
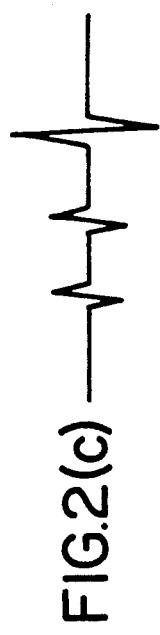
FIG.2(a)
FIG.2(b)
FIG.2(c)
FIG.2(d)

IMAGE PICKUP APPARATUS WITH PICKUP TIME CONTROL AND VARIABLE SIGNAL SUPPRESSION OR CLIPPING

BACKGROUND OF THE INVENTION

1. Field of the Invention

The present invention relates to an image pickup apparatus for reading out an image which was photoelectrically converted during only an arbitrary period of time.

2. Related Background Art

Hitherto, an electronic still camera or a video camera has been known as an apparatus for controlling photoelectric conversion time of an image pickup element to an arbitrary period of time and for reading out signal charges corresponding to an optical image.

To adjust the photoelectric conversion time in the electronic still camera or video camera, there is used a mechanical shutter in a conventional silver halide still camera or what is called an electronic shutter to control a period of time from the completion of the clearing operation of the signal in the image pickup element to the start of the reading operation. A photographer can set a shutter speed to a desired speed. Or, the photoelectric conversion time is controlled so as always to obtain the optimum light amount in accordance with a lens aperture ratio on the basis of the result of calculation by a microcomputer in the camera.

The image pickup element which is used in such a conventional electronic still camera has a problem that in the case of a photographing operation accompanied by a dark current during a long time (for instance, 1/30 to 1/8 second), the S/N ratio deteriorates or the black level fluctuates in proportion to the photoelectric conversion period of time, so that it becomes very hard to see a still image.

SUMMARY OF THE INVENTION

The present invention is made to solve the conventional problems as mentioned above and it is an object of the invention to provide an image pickup apparatus which can obtain a stable image which is not influenced by the dark current component difference in accordance with the duration of the photographing time.

To accomplish the above object, an image pickup apparatus of the embodiment of the invention has means for changing and suppressing a signal of a predetermined band in a video signal from an image pickup element in accordance with the duration of the photoelectric conversion time.

With the above construction, a magnitude to suppress the signal of a predetermined band in the video signal read-out of the image pickup element is changed in accordance with the photoelectric conversion time, so that the influence of an increase in dark current can be fairly reduced.

The above and other objects and features of the present invention will become apparent from the following detailed description and of the preferred embodiments, taken with reference to the accompanying drawings.

BRIEF DESCRIPTION OF THE DRAWINGS

FIG. 1 is a block diagram showing an embodiment in, an image apparatus of the present invention;

FIGS. 2(a)-2(d) are waveform diagrams for each section in FIG. 1; and

DETAILED DESCRIPTION OF THE PREFERRED EMBODIMENTS

Figure 3:
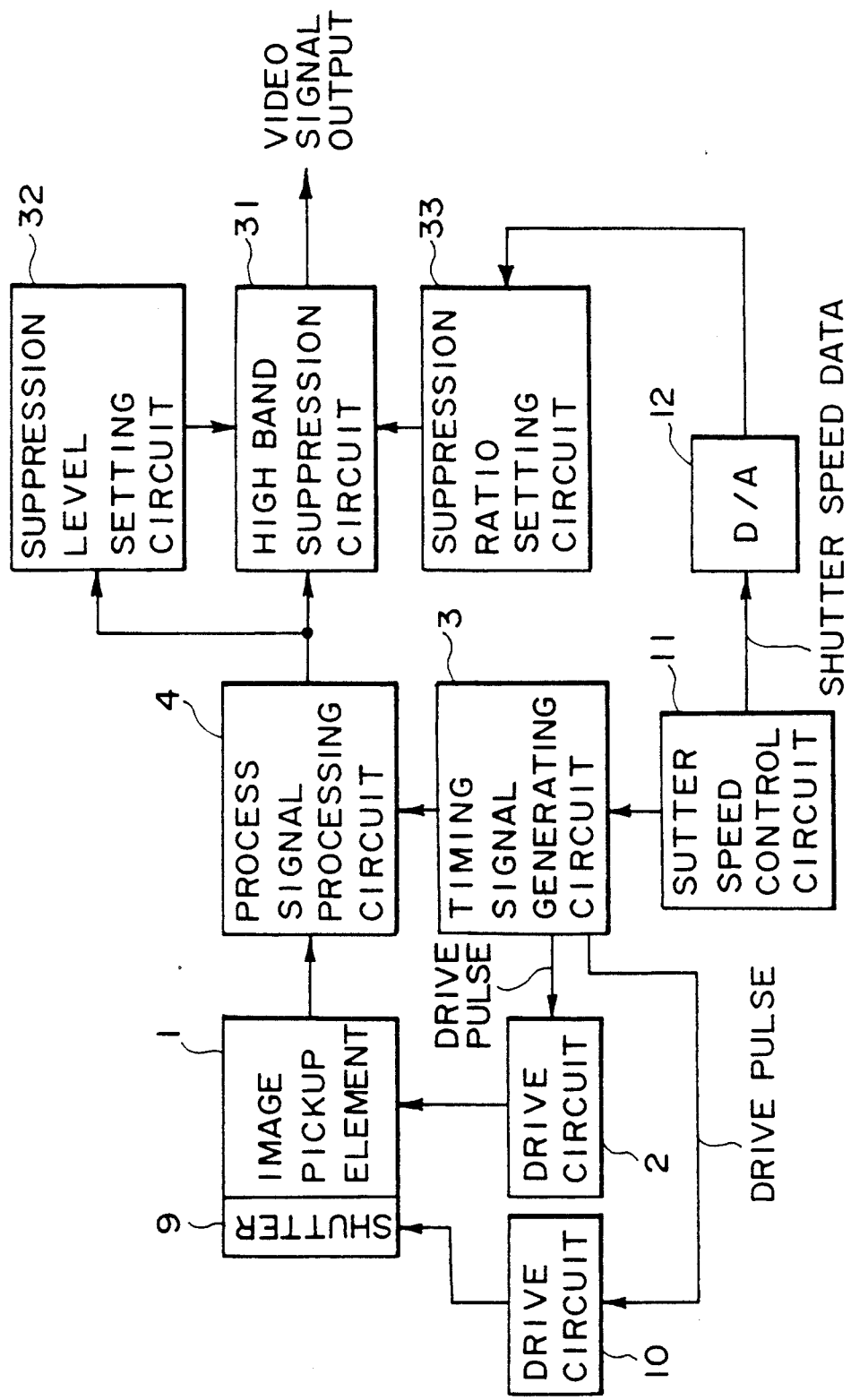
FIG. 3 is a block diagram showing another embodiment of the invention.

FIG. 1 shows an embodiment in an image pickup apparatus of the invention. Reference numeral 1 denotes an image pickup element; 2 indicates a drive circuit of the image pickup element 1; 3 a timing signal generating circuit; 4 a process signal processing circuit; 5 an outline correction signal generating circuit; 6 a circuit to clip the low level of an outline correction signal; 7 a circuit to set a clip range of the low level clip circuit 6; 8 an adder; 9 a mechanical shutter or the foregoing electronic shutter which is controlled on the basis of the period of time from the completion of the clearing operation of the signal in the image pickup element to the start of the reading operation; 10 a drive circuit of the shutter 9; 11 a shutter speed control circuit; and 12 a D/A converter.

In the above construction, the shutter speed (photoelectric conversion time) control circuit 11 allows the timing signal generating circuit 3 to output a shutter drive pulse so as to obtain a desired shutter speed of a photographer or a shutter speed which has been programmed so as always to obtain the optimum light amount in association with the aperture ratio on the basis of the result of calculation by a microcomputer in a camera.

The video signal which was photoelectrically converted for only the period of time of the shutter speed which has been set as mentioned above is read out from the image pickup element 1. The read-out video signal is then subjected to processes such as amplification, black level setting, and the like by the process signal processing circuit 4. The outline correction signal generating circuit 5 can be constructed by, for instance, a delay line and a subtracting circuit to calculate the difference between the signal which was delayed by the delay line and the signal before it is delayed. The outline correction signal generated from the generating circuit 5 is clipped by the low level clip circuit 6. However, in the invention, the clip range is changed in accordance with the photoelectric conversion time. That is, the clip range setting circuit 7 is controlled by a binary signal which is obtained by D/A converting the shutter speed data from the shutter speed control circuit 11 by means of the D/A converter 12.

Explanation will be made further in detail with reference to FIGS. 2(a)-2(d). A comparison is made with respect to the case where a shutter speed $T_v$ is set into, for instance, 1/60 second and 1/30 second. FIG. 2(a) shows a waveform of a video signal before the outline is corrected. A rough, stubbly noise signal shows a dark current component. When $T_v = 1/30$ second, the dark current component is increased about twice as large as that in the case where $T_v = 1/60$ second. FIG. 2(b) shows a waveform of the outline correction signal. In the portion where the signal level difference occurs, a waveform such as to emphasize the signal level difference is produced. FIG. 2(c) shows a waveform of the output signal of the low level clip circuit 6. As shown in FIG. 2(b), since the clip range is changed in accordance with the photoelectric conversion time, most of the dark current component is eliminated and is not concerned with the photoelectric conversion time. FIG. 2(d) shows a waveform of the signal which is obtained by adding the signal of FIG. 2(c) to the original signal of FIG. 2(a). Even in the case where $T_v = 1/30$ second, the outline emphasis, which is almost similar to that in the case of $T_v = 1/60$ second can be also executed without deteriorating the S/N ratio.

In this embodiment, the object of the invention is accomplished by changing the clip range of the outline correction signal. However, for instance, by changing the suppression ratio of the outline correction signal, the object of the invention can be also attained.

On the other hand, the signal of a predetermined band in the video signal is not limited to the outline correction signal but may be a signal which is derived by merely being passed through a high pass filter.

FIG. 3 shows another embodiment of the invention. Reference numeral 31 denotes a high band suppression circuit and 32 indicates a suppression level setting circuit to set a suppression level in accordance with the video signal level. Reference numeral 33 denotes a suppression ratio setting circuit. The suppression ratio can be changed on the basis of an output signal which is obtained by D/A converting the shutter speed data from the shutter speed control circuit 11.

According to this embodiment, since the dark current component of the low signal level portion in the video signal can be suppressed by a magnitude which is proportional to the shutter speed, even at any shutter speed, S/N ratios which are almost equal can be obtained in the low luminance signal level portion where the dark current component is conspicuous. On the other hand, since the dark current components are equalized, it is possible to prevent them from being integrated and becoming a black level difference.

Although the second embodiment has been described with respect to the example in which the signal of the high band in the luminance signal is suppressed, the invention is not limited to such an example. For instance, a color modulation signal may be also used. In such a case, the color balance difference in the low luminance portion which is caused due to the dark current component can be eliminated.

As described above, the present invention has a simple construction such that when the image which was photoelectrically converted during only an arbitrary period of time is read out, the magnitude of suppression the signal of a predetermined band in the video signal is changed in accordance with the photoelectric conversion time. Thus, the influence by the dark current component difference due to the photoelectric conversion time difference can be eliminated. It is possible to perform the photographing for a relatively long second.

What is claimed is:

1. An image pickup apparatus comprising:
   (a) an image pickup element;
   (b) photoelectric conversion time control means for variably controlling a photoelectric conversion time of said image pickup element;
   (c) suppressing means for suppressing a signal of a predetermined band in a video signal from the image pickup element; and
   (d) suppressing control means for changing characteristics of suppression by said suppressing means in response to variable control of the photoelectric conversion time.

2. An apparatus according to claim 1, wherein said suppressing means is a circuit to suppress or clip a low signal level of the signal in the predetermined band in the video signal or portion of the low video signal level.

3. An apparatus according to claim 1, wherein said predetermined band is a high frequency band.

4. An apparatus according to claim 1, wherein said suppressing means includes clipping means.

5. An apparatus according to claim 1, wherein said image pickup element includes an interline type CCD.

6. An apparatus according to claim 1, wherein said photoelectric conversion time control means includes a shutter to selectively shut out the optical image.

7. An apparatus according to claim 1, wherein said photoelectric conversion time control means controls a period of time from the completion of a clearing operation of the signal in the image pickup element to the start of a reading operation of the accumulated signal.

8. An image pickup apparatus according to claim 1, wherein said suppressing means includes generating means for generating an outline correction signal in order to emphasize an outline of the video signal.

9. An apparatus according to claim 8, wherein the signal of a predetermined band in the video signal is the outline correction signal to emphasize an outline of the video signal.

10. An image pickup apparatus according to claim 1, wherein said suppressing control means makes suppression stronger as said photoelectric conversion time is longer.

11. An image pickup apparatus comprising:
    (a) an image pickup element;
    (b) exposing means for varying an incident time of an optical image into said image pickup element;
    (c) suppressing means for suppressing the video signal from said image pickup element; and
    (d) suppressing control means for changing characteristics of suppression by said suppressing means in response to variation of the incident time by said exposing means.

12. An apparatus according to claim 11, wherein said suppressing means clips a low amplitude portion of a high band component in the video signal by different amplitudes in accordance with the incident time of the optical image by the exposing means.

13. An apparatus according to claim 11, wherein said image pickup element includes an interline type CCD.

14. An image pickup apparatus according to claim 11, wherein said suppressing means includes generating means for generating an outline correction signal in order to emphasize an outline of the video signal.

15. An apparatus according to claim 14, wherein said suppressing means suppresses the outline emphasis signal of the video signal in accordance with the incident time of the optical image by the exposing means.

16. An image pickup apparatus according to claim 11, wherein said suppressing contorl means makes suppression stronger as said incident time is longer.

* * * * *

UNITED STATES PATENT AND TRADEMARK OFFICE
CERTIFICATE OF CORRECTION

PATENT NO. : 4,994,917
DATED : February 19, 1991
INVENTOR(S) : TSUTOMU TAKAYAMA

It is certified that error appears in the above-identified patent and that said Letters Patent is hereby corrected as shown below:

COLUMN 1

Line 65, "in," should read --in--.
Line 66, "image apparatus" should read --image pickup apparatus--.

COLUMN 2

Line 51, "into," should read --to,--.

COLUMN 3

Line 3, "second" should read --second,--.
Line 44, "suppression" should read --suppression of--.
Line 50, "second." should read --exposure time.--.

COLUMN 4

Line 59, "contorl" should read --control--.

Signed and Sealed this

Twenty-eighth Day of July, 1992

Attest:

DOUGLAS B. COMER

Attesting Officer     Acting Commissioner of Patents and Trademarks